US008240975B1

(12) United States Patent
Ryznic

(10) Patent No.: US 8,240,975 B1
(45) Date of Patent: Aug. 14, 2012

(54) MULTIPLE STAGED COMPRESSOR WITH LAST STAGE AIRFOIL COOLING

(75) Inventor: John E Ryznic, Palm Beach Gardens, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 876 days.

(21) Appl. No.: 12/268,340

(22) Filed: Nov. 10, 2008

Related U.S. Application Data

(60) Provisional application No. 61/004,738, filed on Nov. 29, 2007.

(51) Int. Cl.
F01D 5/14 (2006.01)
F03B 11/00 (2006.01)
F03D 11/00 (2006.01)
F04D 29/38 (2006.01)

(52) U.S. Cl. .......................................... 415/1; 415/115

(58) Field of Classification Search .................. 415/115, 415/1
See application file for complete search history.

(56) References Cited

U.S. PATENT DOCUMENTS
6,098,395 A * 8/2000 North .............................. 60/782
* cited by examiner Primary Examiner — David S Blum
(74) Attorney, Agent, or Firm — John Ryznic

(57) ABSTRACT

A high compression ratio compressor having multiple stages of airfoils to produce the high pressure rations, where the last stage airfoils are cooled by passing cooling air through the airfoils without discharging film cooling air. The cooling air for the airfoils is bled off from an upstream stage of the compressor, passed through the airfoil to provide for the cooling, and then discharged back into the compressor at a stage upstream of where the bleed off air was extracted and where the pressure is lower. Because of the high pressure rations, the air temperature in the compressor is at such a high temperature that the last stage airfoils must be cooled to prevent thermal damage.

12 Claims, 1 Drawing Sheet

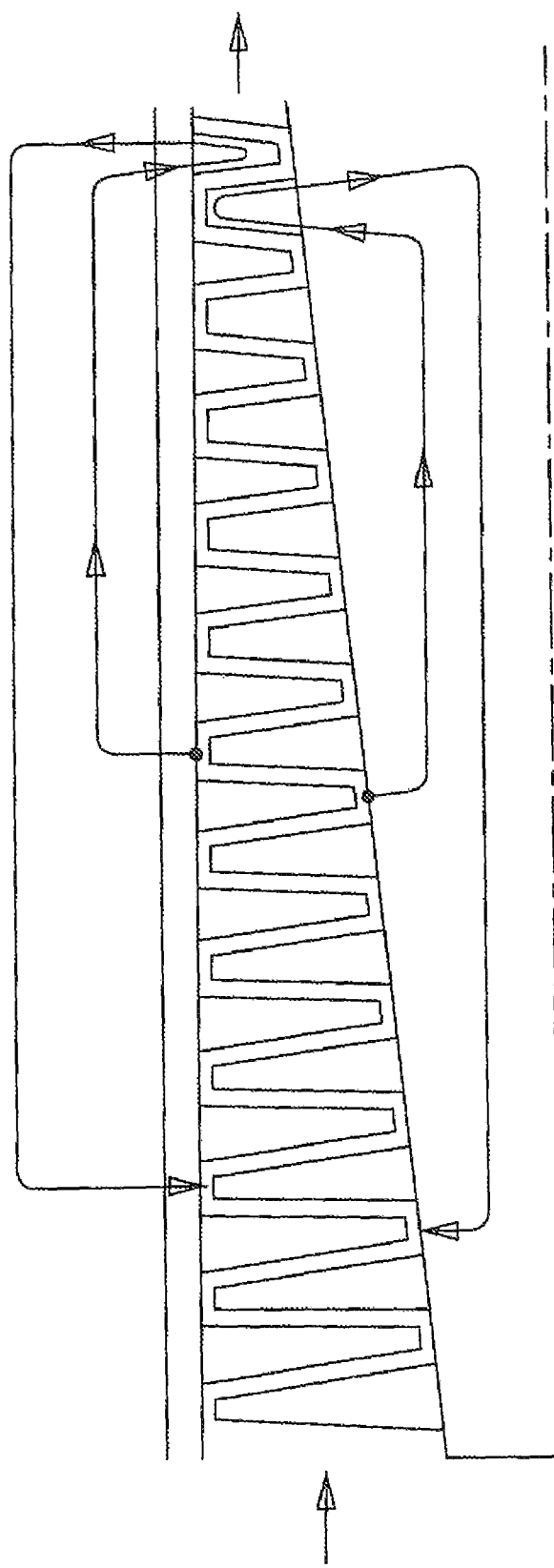

MULTIPLE STAGED COMPRESSOR WITH LAST STAGE AIRFOIL COOLING

BACKGROUND OF THE INVENTION

1. Field of the Invention

The present invention relates go gas turbine engines, and more specifically to a high pressure ratio compressor with last stage airfoil cooling used in a gas turbine engine.

2. Description of the Related Art Including Information Disclosed Under 37 CFR 1.97 and 1.98

A gas turbine engine, such as an aero engine used to power an aircraft or an industrial gas turbine engine used to produce electric power, is a very efficient power plant. The compressed air from a compressor is passed into a combustor where the air is burned with a fuel to produce a hot gas flow, the hot gas flow is then passed through a turbine to drive the rotor shaft connected to the compressor and, in the case of an aero engine produce thrust and/or drive the fan, or in the case of the IGT drive an electric generator to produce the electric power. In both cases, the efficiency of the engine can be increased by passing a higher temperature gas into the turbine.

Modern gas turbine engines have multiple stages in the compressor in order to produce the very high pressure ratios between the outlet of the compressor and the inlet. For example, the Pratt & Whitney F100 aero engine that is used to power the military F 15 and F16 fighter aircraft includes 13 stages in the compressor and produces a pressure ratio of 30 to 1 (the outlet pressure is 30 times the inlet pressure). A higher pressure ratio will allow for higher efficiencies for the engine. With the recent improvements in compressor design, a higher number of stages can be used to produce an even higher pressure ratio. Futures aero engines are anticipated to have compressor ratios in the 50s.

However, as the air through the compressor is compressed, the temperature of the compressed air also increases. A multiple stage compressor will generally add 90 degrees F. to the compressed air for each stage. As the number of stages in the compressor grows, the compressor outlet air becomes higher to the point where the last stage airfoils (stator vanes and compressor blades) become so hot that the airfoils can be damaged from the high thermal load. Thus, there is a need in the prior art for a multiple stage compressor with a very high pressure ratio to have cooling of the last stage airfoils in the compressor in order to withstand the higher temperatures.

BRIEF SUMMARY OF THE INVENTION

It is an object of the present invention to provide for a multiple stage compressor with high pressure ratio with cooling of the last stage airfoils.

It is another object of the present invention to provide for a multiple stage compressor with a high pressure ratio that has higher efficiency than the prior art.

A compressor in a gas turbine engine in which the compression ratio is so high that the last stage rotor blades and stator vanes require cooling to prevent overheating of these airfoils due to the higher air temperature resulting from the increased compression ratio produced by the engine. The last stage blades and vanes include internal cooling air passages to produce cooling through convection and impingement. The compressed air used for cooling these airfoils is bled off from an upstream stage of the compressor, passed through the airfoils for cooling, and then reintroduced into the compressor at an upper stage from where the bleed off air was first extracted.

Because the air pressure used for the cooling of the last stage airfoils is less than the external air flow pressure around these cooled air foils, the cooled air foils cannot include discharging film cooling air for cooling the exterior surface because of the differential pressure. The cooled airfoils are thus cooled by a closed system and the spent cooling air reintroduced into the compressor at a location upstream from the bleed off location.

BRIEF DESCRIPTION OF THE SEVERAL VIEWS OF THE DRAWINGS

FIG. 1 shows a cross section view of the multiple stage compressor of the present invention.

DETAILED DESCRIPTION OF THE INVENTION

The present invention is a multiple stage compressor that produces a very high pressure ratio such that cooling of the last stage or stages of the compressor air required. The compressor is intended to be used in a gas turbine engine such as an aero engine or an IGT engine. However, the present invention could be used in any turbomachine in which a multiple stage compressor is used that produces the high pressure ratio in which cooling of the last stage airfoils is required to prevent thermal damage.

FIG. 1 shows a cross section of the compressor of the present invention in which a number of stages are present with each stage having a stator or guide vane located upstream from an associated rotor blade. In a typical multiple stage compressor of an aero engine, the outer diameter of the compressor is about at a constant radial diameter while the inner diameter is conical shaped with a decreasing airfoil spanwise height in the downstream direction. The inlet air to the compressor is at atmospheric pressure. The compressor progressively compresses the air as the compressed air passes through the multiple stages. As the air is compressed, the temperature of the compressed air increases. A typical compressor will increase the compressed air temperature about 90 degrees F. in each stage. In the last stages, the compressed air can be at such a high temperature that the airfoils can be damaged from the high temperature. The material properties of these airfoils are such that the high temperature compressed airs passing through these airfoils exceed the safe temperature level for the materials.

In the present invention is FIG. 1, the last stage vanes and blades include closed loop cooling air passages to pass cooling air through the airfoils without discharging the cooling air into the high temperature compressed air stream through the compressor. The internal airfoil cooling passages can be any type of prior art closed loop cooling passage circuit that makes use of well known convection cooling and impingement cooling of airfoils. Compressed cooling air from a middle stage of the compressor is bled off and passed through a cooling air passage in the rotor shaft assembly and into the inlet of the internal cooling air passage of the rotor blade. The cooling air passes through the rotor blade cooling passage and then flows through a return air passage also in the rotor shaft to be discharged into the compressor at a stage upstream from the bled off stage. This is due to the loss of pressure in the cooling air from passing through the cooling passages in the rotor shaft and the rotor blade.

To cool the last stage stator vane, cooling air is also bled off from the compressor at a middle stage and directed through a cooling air passage and into the internal cooling air passage formed within the stator vane. The cooling air passes through the vane cooling passage, and is then directed through a return air cooling air passage and into the compressor at a stage upstream from the bled off location. This is also due to the loss of pressure in the cooling air from passing through the cooling supply passages in the casing and the stator vane. The bleed off air used for cooling of the last stage airfoils is from the lowest stage that would produce enough pressure to pass through the cooling circuit for the airfoils while still allowing for the spent cooling air to be discharged into an upstream stage of the compressor. The further down the compressor stages that the cooling air is bled off from, the higher the temperature of the cooling air used to pass through the airfoils for cooling.

Bleeding off the compressed air used for the cooling and then re-supplying the cooling air back into the compressor minimizes the loss in the compressor. The heat picked up from the cooling air passing through the cooling passages within the airfoils is passed back into the compressor mainstream air. The only significant losses are due to the pressure loss from the cooling air passing through the cooling passages from the bleed off location to the re-supply location.

In other embodiments, other stages of the blades and vanes in the compressor can also be cooled by passing bleed off cooling air through the internal cooling passages and then re-supplying the cooling air to the compressor. The number of stages in the compressor that require cooling would depend upon the compressed air temperature passing through those stages. Also, the stage at which the cooling air is bled off will depend upon the required pressure for the cooling air that is needed to pass through the cooling air passages and be discharged back into the compressor. The re-supply locations will depend upon the pressure difference between the main stream compressed air and the re-supply cooling air. The re-supply cooling air must be at a higher pressure than the mainstream compressor air or a backflow will occur. Since the airfoil internal cooling passage is a closed loop passage (no cooling air is discharged from the airfoil out into the mainstream compressor air flow), the pressure of the cooling air can be lower than the pressure of the main stream compressed air passing through that airfoil.

Also, in another embodiment, the cooling air can be discharged into the turbine section to provide cooling for turbine airfoils such as rotor blades and stator vanes and then discharged into the hot gas flow passing through the turbine if the pressure differential is high enough to prevent backflow into the turbine airfoils.

In another embodiment, the cooling air from the compressor airfoils can be passed through a turbocharger to increase the pressure of the cooling air, and then passed into the combustor to be burned with the fuel. With this embodiment, the heated cooling air is burned with the fuel to produce the hot gas flow that is passed through the turbine to drive the rotor shaft.

I claim the following:

1. A multiple stage compressor comprising:
   a plurality of stages of airfoils;
   the last stage of airfoils having an internal cooling air circuit to provide cooling for the airfoil;
   a cooling air supply passage to supply cooling air to an cooling air inlet of the last stage airfoil;
   the cooling air supply passage connected to a stage of the compressor having a lower pressure than the last stage airfoil;
   a cooling air discharge passage to discharge spent cooling air from a cooling air outlet of the last stage airfoil; and,
   the cooling air discharge passage connected to a different stage of the compressor having a lower pressure than the stage supplying the compressor cooling air to the last stage airfoil.

2. The multiple stage compressor of claim 1, and further comprising:
   the last stage airfoils are rotor blades or stator vanes.

3. The multiple stage compressor of claim 1, and further comprising:
   the compressor is an axial flow compressor used in a gas turbine engine.

4. The multiple stage compressor of claim 1, and further comprising:
   the cooling circuit in the last stage airfoils is a closed cooling circuit such that cooling air is not discharged out from the last stage airfoils as film cooling air.

5. The multiple stage compressor of claim 2, and further comprising:
   the stage that supplies cooling air to the airfoils is the same; and,
   the stage that discharges cooling air from the airfoils is the same.

6. The multiple stage compressor of claim 1, and further comprising:
   the internal cooling air circuit for the airfoil provides impingement cooling and convection cooling of the airfoil.

7. The multiple stage compressor of claim 1, and further comprising:
   the compressor is a high compression ratio compressor.

8. A process for cooling a last stage airfoil of a high compression ratio compressor, the compressor having a plurality of stages, the process comprising the steps of:
   bleeding off a portion of the compressed air from the compressor at a stage that produces compressed air at a first pressure;
   passing the compressed air from the bleed off air through the last stage airfoil to provide internal cooling of the last stage airfoil; and,
   discharging the spent cooling air from the last stage airfoil into the compressor at a stage that produces compressed air at a second pressure that is lower than the first pressure.

9. The process for cooling a last stage airfoil of a high compression ratio compressor of claim 8, and further comprising the step of:
   passing the cooling air through the last stage airfoil without discharging film cooling air.

10. The process for cooling a last stage airfoil of a high compression ratio compressor of claim 9, and further comprising the step of:
    cooling the last stage airfoil with impingement and convection cooling.

11. The process for cooling a last stage airfoil of a high compression ratio compressor of claim 9, and further comprising the step of:
    passing cooling air through the last stage rotor blades.

12. The process for cooling a last stage airfoil of a high compression ratio compressor of claim 11, and further comprising the step of:
    passing cooling air through the last stage stator vanes in parallel to the cooling air passing through the last stage rotor blades.

* * * * *